Patented Dec. 30, 1952

2,623,838

UNITED STATES PATENT OFFICE 2,623,838

INSECTICIDE

Harry Bender, Torrance, Calif., assignor to Stauffer Chemical Company, a corporation of California No Drawing. Application March 2, 1950, Serial No. 147,327

6 Claims. (Cl. 167—30)

This invention relates to the killing of pests.

I have found that compounds having two phenyl groups linked together by sulfur or by a sulfoxide group and having only one of the phenyl groups substituted with chlorine or bromine, and this only in the para position, are effective in killing mites, particularly plant-feeding mites belonging to the family Tetranychadae, in all stages of their development, e. g. eggs, and all mature and immature post-embryonic forms. These compounds are generally of the formula:

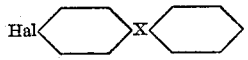

where Hal is either chlorine or bromine and X is sulfur or SO. The preferred compounds are those containing chlorine, that is, p-chlorophenyl phenyl sulfide and p-chlorophenyl phenyl sulfoxide, but the bromo compounds are also useful.

As against mites, these compounds are quite effective. For example, in comparison with O,O-diethyl-O-p-nitrophenyl thiophosphate (parathion), these compounds are more effective in controlling various species of mites at the concentrations commonly employed in field applications. Reference has been made to parathion for comparison because it is presently regarded as a very effective miticide and is being used extensively on a commercial scale.

These compounds of this invention can be applied in any desired manner, as in an aqueous spray, as an aerosol, as a dust, or in solution in a solvent, as a deodorized kerosene. When applied in an aqueous spray, the compound should be present in a concentration of from 0.01% to 1.0%; usually about 0.05% to 0.25% by weight. When applied as a dust, the compound should be present in a concentration between 1% and 50% or more by weight in a suitable inert carrier; the usual dust contains about 5%. The compounds are solids at ordinary temperatures and are not difficult to compound; one can employ them in any of the dry or wet carrier compositions utilized heretofore to apply pest control materials.

To test against adult mites and eggs, potted pinto beans plants, heavily, infested with all stages of the two-spotted mite, *Tetranychus bimaculatus* (Harvey), were sprayed in groups of two with various aqueous spray compositions containing each of the aforementioned compounds; the compositions were identical, a concentration of 0.06% of each compound being employed; a water suspension was made up by adding 0.015% Aerosol OT (di-octyl sodium sulfosuccinate) and a .005% Methocell (viscosity 25 cps.) to tap water with sufficient of the toxicants, preferably in a dilute acetone solution (2½%–5%), to provide a 0.06% suspension. On all of the plants sprayed with these compositions, there was a complete kill of eggs and all post-embryonic forms. All plants remained free of mites for fourteen days thereafter, at which time the experiment was terminated. A conventionally formulated parathion aqueous spray containing 0.06% of parathion, applied in an identical manner and under the same conditions, caused a 100% mortality of all post-embryonic forms, but only 90% of the eggs. The mite population on the parathion sprayed plants had increased appreciably when the test was terminated after fourteen days because of the incomplete ovicidal action of the parathion. The mite infestation on the unsprayed control plants increased rapidly and, at the termination of the experiment, their leaves had been destroyed by the excessive injury caused by the mites.

Each of the compounds can be made by known procedures. For example, the monochloro and monobromo-diphenyl sulfides can be made by chlorinating or brominating diphenyl sulfide, under anhydrous conditions, as with a solution of chlorine or bromine in carbon tetrachloride. These compounds can then be oxidized with a hypochlorite to the sulfoxide.

As illustrative of further useful compositions, the following are set forth:

50 pounds of p-monochlorodiphenyl sulfide were dispersed on 49.5 pounds of Attaclay, a finely divided clay, together with a half pound of Duponal 51, a higher aliphatic alcohol sulfate wetting agent. The final composition provided a dry powder which, when placed with water, wetter readily; the composition was sprayed on a mite habitat. Such compositions are usually applied at the rate of about two pounds per 100 gallons of water, although this can be varied between about one-half pound and four pounds per 100 gallons. In place of Attaclay, one can use any other suitable inert finely divided carrier such as pyrophyllite, diatomaceous earth, bentonite, volcanic ash, talc, lignocellulosic flour, sulfur, and mixtures of these. The concentration of the compounds in the finished product can vary; generally, it is desirable to utilize as much of the effective compound as is feasible and economical and the concentration of the compounds can be increased to the order of 90% and up to 98%. The compounds can also be applied as a dust, being mixed with any of the aforementioned carriers. In this instance, the concentration of the compound can vary over fairly wide limits, as between 1% and 50%.

The compounds can also be applied as a liquid dispersed in water and one can make up a liquid concentrate by dissolving the compound in a suitable solvent and adding a wetting agent. Generally it is desirable that the concentration of the compound be as high as its solubility in a given solvent will permit. A typical composition includes 20% by weight of the compound, sufficient wetting agent, 10% of acetone and the balance xylene or an equivalent solvent such as a petroleum fraction known as Socal 3. In case the compound is soluble only to a limited extent in one of the less expensive solvents, it is desirable to add a small amount of a mutual solubilizing agent such as acetone.

I claim:

1. An acaricide consisting essentially of an active ingredient, having the formula

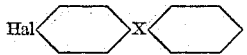

where Hal is a member chosen from the group consisting of chlorine and bromine and X is a member chosen from the group consisting of S and SO and a carrier substance.

2. An acaricide consisting essentially of an active ingredient having the formula

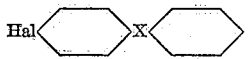

where Hal is a member chosen from the group consisting of chlorine and bromine and X is a member chosen from the group consisting of S and SO, in the form of powder and a diluent therefor.

3. An acaricide consisting essentially of an active ingredient having the formula

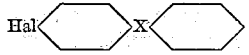

where Hal is a member chosen from the group consisting of chlorine and bromine and X is a member chosen from the group consisting of S and SO, dispersed in an aqueous emulsion.

4. The method of killing mites which consists in distributing on growing plants a material having the formula

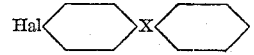

where Hal is a member chosen from the group consisting of chlorine and bromine and X is a member chosen from the group consisting of S and SO, in a carrier therefor consisting of a finely divided solid material.

5. A method for control of mites consisting of applying to growing plants an aqueous dispersion of an effective concentration of a material having the formula:

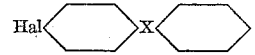

where Hal is a member chosen from the group consisting of chlorine and bromine and X is a member chosen from the group consisting of S and SO.

6. A method for control of mites consisting of applying to growing plants a composition including an inert insecticidal adjuvant as a carrier and an ingredient having the formula:

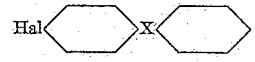

where Hal is a member chosen from the group consisting of chlorine and bromine and X is a member chosen from the group consisting of S and SO.

HARRY BENDER.

REFERENCES CITED

The following references are of record in the file of this patent:

UNITED STATES PATENTS

| Number | Name | Date |
| --- | --- | --- |
| 2,148,928 | de Meuron | Feb. 28, 1939 |

OTHER REFERENCES

Lauger et al.: Helvetica Chimica Acta, volume XXVII, Fasciculus Quantius, June 15, 1944, page 905.

Knipling: J. Econ. Ent., April 1941, page 315.

Hampson et al.: Proc. Ray. Soc. (London), volume A 143, pages 147 to 168 (1933).